United States Patent Office 3,265,746
Patented August 9, 1966

3,265,746
METHOD OF MAKING PERFLUOROSTYRENE
Leo A. Wall, Washington, D.C., and Joseph M. Antonucci, Silver Spring, Md., assignors to the United States of America as represented by the Secretary of the Navy
No Drawing. Filed Jan. 18, 1962, Ser. No. 167,195
2 Claims. (Cl. 260—651)

The invention described herein may be manufactured and used by or for the Government of the United States of America for governmental purposes without the payment of any royalties thereon or therefor.

This invention relates to a method of making perfluorostyrene.

Perfluorostyrene is useful as an ingredient for making stable plastics and rubbers.

An object of the invention is the preparation of perfluorostyrene (octafluorostyrene).

Other objects and many of the attendant advantages of this invention will be readily appreciated as the same becomes better understood by reference to the following detailed description.

The synthesis of perfluorostyrene (octafluorostyrene) is accomplished according to the present invention by the following sequence of reactions:

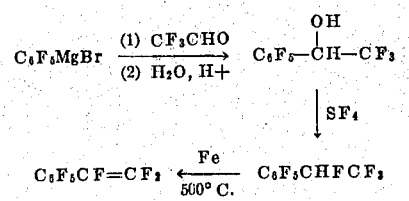

The procedures for carrying out each of the reactions are given herewith.

SYNTHESIS OF PENTAFLUOROPHENYLTRIFLUOROMETHYL CARBINOL

The Grignard reagent $C_6F_5MgBr$ of pentafluorobromobenzene is prepared in a manner known in the art according to the procedure of Pummer and Wall (J. Research NBS, 63A, 167 (1959)). In the typical example the starting material can be 43 g. (0.17 mole) of pentafluorobromobenzene. The preparation is performed in a 500-ml. three-necked flask equipped with a Teflon stirrer, a low-temperature condenser fitted with a drying tube, and a pressure-equalized dropping funnel carrying a nitrogen inlet tube. After the Grignard reagent is prepared, the flask is cooled conveniently to −78° C. and trifluoroacetaldehyde is added by means of a gas inlet tube which is substituted for the dropping funnel. Trifluoroacetaldehyde is conveniently prepared from 50 g. (0.43 mole) of trifluoroacetaldehyde hydrate by dehydration using a slurry of 22 g. of phosphorus pentoxide and 83 ml. of 97% sulfuric acid kept at 90° C. The aldehyde is collected in a trap cooled to −78° C. The aldehyde is distilled into a second trap kept at −78° C. and then into the flask containing the Grignard reagent at −78° C. The mixture in the flask is allowed to come to room temperature and then refluxed gently for one hour and finally allowed to stand at room temperature overnight. A dark brown complex is formed which is decomposed with 5% sulfuric acid and thereafter the aqueous layer is separated from the ether layer and extracted several times with ether. The ether extracts and the ether layer are combined, washed with a saturated sodium bicarbonate solution, then with a saturated sodium chloride solution, and finally dried over anhydrous sodium sulfate overnight.

After the drying agent is removed, the ether and other volatile materials are removed by distillation. A solid dark residue remains which is sublimed under autogenous pressure conveniently using a water bath at 60–75° C. to give a white crystalline solid (found F, 56.5; theory 57.1). Infrared and mass spectra analysis indicate that the solid thus produced is the carbinol. The yield is about 20 g. (44%).

SYNTHESIS OF β,β,β-TRIFLUORO-α-FLUOROETHYLPENTAFLUOROBENZENE

Example A

In a silver-lined steel bomb is placed a quantity of pentafluorophenyltrifluoromethyl carbinol, in a typical example, 17 g. (0.64 mole). The bomb is evacuated and then flushed with a stream of nitrogen. This procedure is repeated several times, and finally the bomb is evacuated and cooled to −80° C. It is then sealed and connected to a tank or other supply of sulfur tetrafluoride with any suitable conduit such as a copper coil. Approximately 10 to 15 g. of sulfur tetrafluoride are introduced into the bomb while the bomb is kept at −80° C. The bomb is then allowed to warm to room temperature and placed in a shaker and heated to 50° C. After two hours at this temperature an exothermic reaction occurs, as indicated by the rise in temperature to 85° C. The heating is stopped and the shaking is allowed to continue for say three hours until the temperature reaches 50° C. The bomb is then removed from the shaker and cooled to room temperature. The excess sulfur tetrafluoride, hydrogen fluoride and other volatiles are vented through a series of traps. The series includes first a backup trap and then a trap at −30° C. and then two traps containing dilute potassium hydroxide at 0° C. The bomb is allowed to vent overnight.

The contents of the bomb, after venting, is emptied into about 300 ml. of n-pentane containing about 15 g. of sodium fluoride. The bomb is washed out with small portions of n-pentane and diethyl ether.

The low-boiling solvents are removed by distillation. The high-boiling residue is then distilled under nitrogen at atmospheric pressure to give about 2 g. of a colorless liquid (B.P. 110–130°/760 mm). Mass spectral analysis indicates the presence of the desired nonafluoroethylbenzene.

Example B

Better yields of α-hydrononafluoroethylbenzene are obtained if n-pentane is used as a diluent in the fluorination reaction. For example, 27 g. (0.10 mole) of the carbinol is placed in a 180 ml. silver-lined bomb along with 90 to 100 ml. of dry freshly distilled n-pentane. To this is added, using the technique described above, 25 g. (0.23 mole) of sulfur tetrafluoride. The bomb is heated 50–90° for 12 to 15 hours. The volatile gases are removed as described above and after removal of the n-pentane by the usual distillation processes, a yield of 24 to 25 g. (approximately 90%) of α-hydrononafluoroethylbenzene, B.P. 130–131° C. is obtained.

PYROLYSIS OF β,β,β-TRIFLUORO-α-FLUOROETHYLPENTAFLUOROBENZENE

The nonafluoroethylbenzene can be dehydrofluorinated thermally to yield perfluorostyrene (octafluorostyrene).

Several examples of various thermal dehydrofluorinations are as follows:

Example 1: Nonafluoroethylbenzene is dropped through a heated iron tube under a continuous stream of nitrogen gas. The iron tube is heated to the desired temperature by means of an electric furnace and the product is collected in traps cooled either by liquid nitrogen or dry-ice acetone baths. Various temperatures ranging from 400 to 550° C. can be employed.

Example 2: Nonafluoroethylbenzene is vaporized into a heated iron tube maintained at reduced pressures. Pressures of 0.1 mm. to 20 mm. can be employed and temperatures ranging from 600 to 850° C.

Example 3: Nonafluoroethylbenzene is either dropped (atmospheric pressure pyrolysis) of vaporized (reduced pressure pyrolysis) into a heated iron tube partially filled with iron wool or other suitable packing at temperatures in the range of 450 to 700° C.

Mass spectral analysis and infrared spectroscopy of this final product confirm the presence of perfluorostyrene. Examination of the pyrolysates by vapor phase chromatography indicates the product is present in amounts of 10 to 25%. The only other major substances seen by the vapor-phase chromatography is the nonafluoroethylbenzene.

Obviously many modifications and variations of the present invention are possible in the light of the above teachings. It is therefore to be understood that within the scope of the appended claims the invention may be practiced otherwise than as specifically described.

What is claimed is:

1. The method of making perfluorostyrene which comprises reacting the Grignard reagent $C_6F_5MgBr$ of pentafluorobromobenzene with trifluoroacetaldehyde and decomposing the reaction product thereof with acidulated water to produce pentafluorophenyltrifluoromethyl carbinol; reacting the pentafluorophenyltrifluoromethyl carbinol with sulfur tetrafluoride to produce $\beta,\beta,\beta$-trifluoro-$\alpha$-fluoroethylpentafluorobenzene; and pyrolyzing said last-named compound in the presence of iron.

2. The method of claim 1 wherein the pentafluorophenyltrifluoromethyl carbinol is first diluted with n-pentane and then reacted with sulfur tetrafluoride.

References Cited by the Examiner
UNITED STATES PATENTS

| | | | |
|---|---|---|---|
| 2,689,241 | 9/1954 | Dittman et al. | 260—650 |
| 3,187,058 | 6/1965 | Patrick et al. | 260—651 |

OTHER REFERENCES

Stacey et al., Advances in Fluorine Chemistry, vol. 2, Butterworths, London (1961) pp. 96–98.

LEON ZITVER, *Primary Examiner.*

A. D. SULLIVAN, *Examiner.*

S. H. BLECH, J. W. WILLIAMS, K. H. JOHNSON, K. V. ROCKEY, *Assistant Examiners.*